(12) United States Patent
Sieger

(10) Patent No.: US 7,503,101 B2
(45) Date of Patent: Mar. 17, 2009

(54) LOOP/LARIAT SPECTACLE HOLDER

(76) Inventor: Arlette Sieger, 28 Wood Valley La., Port Washington, NY (US) 11050

( * ) Notice: Subject to any disclaimer, the term of this patent is extended or adjusted under 35 U.S.C. 154(b) by 256 days.

(21) Appl. No.: 11/122,573

(22) Filed: May 5, 2005

(65) Prior Publication Data

US 2005/0248721 A1    Nov. 10, 2005

Related U.S. Application Data

(60) Provisional application No. 60/568,687, filed on May 7, 2004.

(51) Int. Cl.
*A44B 21/00* (2006.01)
(52) U.S. Cl. .............. 24/3.1; 24/3.4; 24/66.9; 224/258
(58) Field of Classification Search .......... None
See application file for complete search history.

(56) References Cited

U.S. PATENT DOCUMENTS

| | | | |
|---|---|---|---|
| 2,191,932 A | 2/1940 | Crimmins | |
| 4,965,913 A * | 10/1990 | Sugarman | 24/3.3 |
| 5,699,140 A | 12/1997 | Fuhrman | |
| 5,893,198 A | 4/1999 | DeCotis | |
| 5,956,812 A | 9/1999 | Moennig | |
| 6,070,303 A | 6/2000 | Macy et al. | |
| 6,076,925 A | 6/2000 | Kraut | |
| 6,533,414 B2 | 3/2003 | Newler | |
| 6,539,587 B2 | 4/2003 | Harrison | |
| 6,688,507 B2 | 2/2004 | McCormack | |
| D487,344 S | 3/2004 | Sieger | |
| 2005/0268650 A1* | 12/2005 | Armani | 63/3.2 |

* cited by examiner

*Primary Examiner*—Jack W. Lavinder
(74) *Attorney, Agent, or Firm*—Scully, Scott, Murphy & Presser, P.C.

(57) ABSTRACT

A spectacle holder including: a loop member; and a sliding member slidingly disposed on the loop member; wherein the sliding member slides on the loop member to capture a portion of a spectacle in a portion of the loop member. The sliding member can be decorative, such as a charm, broach, or pendant. The sliding member can also have one or more holes therethrough for acceptance of first and second strands of the loop member, the one or more holes having an exit located above a lower portion of the sliding member such that the portion of the loop member is hidden from view when worn by a user and no spectacle is captured.

10 Claims, 4 Drawing Sheets

LOOP/LARIAT SPECTACLE HOLDER

CROSS REFERENCE TO RELATED APPLICATION

This application claims benefit to U.S. Provisional Application Ser. No. 60/568,687 filed on May 7, 2004, the entire contents of which is incorporated herein by reference.

BACKGROUND OF THE INVENTION

1. Field of the Invention

The field of art to which this invention relates is spectacle holders, and more particularly to a loop/lariat spectacle holder.

2. Description of the Related Art

Eyeglass holders worn by a user for suspending eyeglasses therefrom are well known in the art. Such eyeglass holders are disclosed in U.S. Pat. Nos. 5,033,612; 5,680,191; and 6,075,925. Such eyeglass holders are useful for users, who don't always need to wear their eyeglasses, who do not want to always wear their eyeglasses, or who wish to carry another pair of eyeglasses, such as sunglasses. For such people, the eyeglass holders provide a convenient place to carry their eyeglasses while they are not being worn, and in some instances, such as in the eyeglass holders disclosed in U.S. Pat. Nos. 5,860,191, Des 465,327, and Des 487,344, they do so in an attractive and decorative manner. The contents of U.S. Pat. Nos. 5,860,191, Des 465,327, and Des 487,344, are incorporated herein by their reference in their entirety.

Although such decorative eyeglass holders have utility and advantages over the spectacle holders known prior thereto, they generally do not positively "trap" the spectacles or double as a necklace when not used to hold spectacles.

SUMMARY OF THE INVENTION

Thus, it is an object of the present invention to provide a spectacle holder that overcomes the disadvantages of the prior art.

Accordingly, a spectacle holder is provided. The spectacle holder comprises: a loop member; and a sliding member slidingly disposed on the loop member; wherein the sliding member slides on the loop member to capture a portion of a spectacle in a portion of the loop member.

The loop member can be a continuous loop of material. Alternatively, the loop member can have first and second ends and a clasp for attaching the first and second ends to form a loop.

The loop member can be fabricated from a material chosen from a group consisting of fabric, rope, and chain.

The sliding member can have a single hole therethrough for acceptance of first and second strands of the loop member. Alternatively, the sliding member can have first and second holes therethrough for acceptance of first and second strands of the loop member, respectively.

The sliding member can have one or more holes therethrough for acceptance of first and second strands of the loop member, the one or more holes being integrally formed in the sliding member. Alternatively, the one or more holes can be formed on an exterior surface of the sliding member.

The sliding member can be decorative. The decorative sliding member can be chosen from a group consisting of a charm, broach, and pendant.

The sliding member can have one or more holes therethrough for acceptance of first and second strands of the loop member, the one or more holes having an exit located above a lower portion of the sliding member such that the portion of the loop member is hidden from view when worn by a user and no spectacle is captured.

Also provided is a method for holding spectacles on a user. The method comprising: placing a portion of the spectacles in a loop member worn by the user; and sliding a sliding member on the loop member to capture the portion of a spectacle in a portion of the loop member.

Wherein the loop member is worn around a neck of the user, the method can further comprise wearing the loop member as a decorative necklace while no spectacle is being captured in the portion of the loop member.

The method can further comprise hiding the portion of the loop member from view while no spectacle is being captured in the portion of the loop member.

Still further provided is a decorative necklace. The decorative necklace comprising: a loop member; and a decorative sliding member slidingly disposed on the loop member; wherein the decorative sliding member slides on the loop member to capture a portion of a spectacle in a portion of the loop member.

The loop member can be a continuous loop of material.

The loop member can have first and second ends and a clasp for attaching the first and second ends to form a loop.

The loop member can be fabricated from a material chosen from a group consisting of fabric, rope, and chain.

The decorative sliding member is chosen from a group consisting of a charm, broach, and pendant.

The decorative sliding member can have one or more holes for acceptance of first and second strands of the loop member, the one or more holes having an exit located above a lower portion of the decorative sliding member such that the portion of the loop member is hidden from view when worn by a user and no spectacle is captured.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Although the spectacle holder described herein has particular utility when suspended around the neck of a user, the invention is not limited thereto. For example, the spectacle holder can also be suspended from another article or device, such as the eyeglass holders disclosed in U.S. Pat. Nos. 5,860, 191, Des 465,327, and Des 487,344. As used herein, spectacle shall mean any form of eyeglasses, reading glasses, sunglasses and the like. Furthermore, as used herein, "front" shall mean the portion of the spectacle holder that is visible while being worn by a user, "back" shall mean the portion of the spectacle holder facing the user and not visible while being worn by a user, "top" shall mean the portion of the spectacle holder facing in the direction of a head of the user while being worn by the user, and "bottom" shall mean the portion of the spectacle holder facing in the direction away from a head of the user while being worn by the user.

Figure 1:
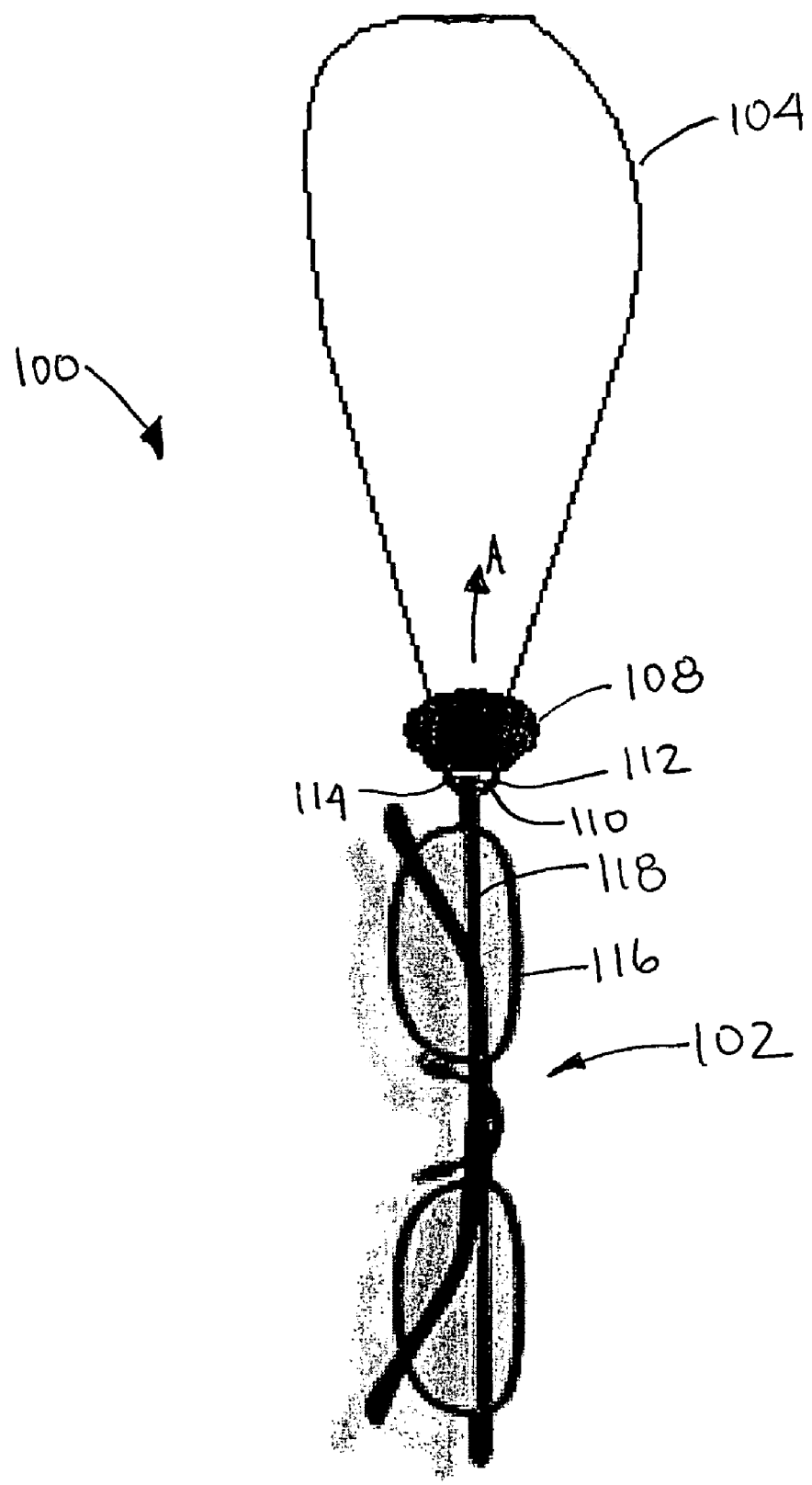
FIG. 1 illustrates a perspective view of a spectacle holder having a spectacle captured therein.
Figure 2:
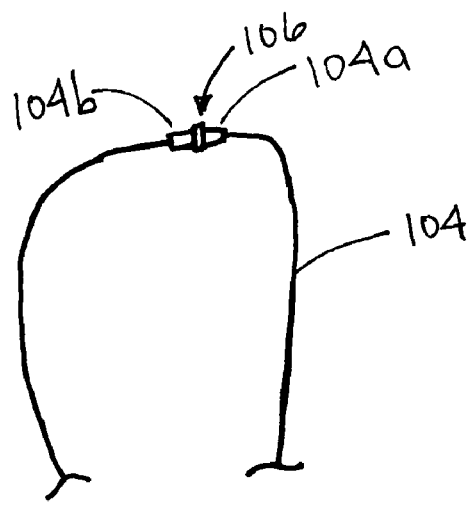
FIG. 2 illustrates a loop member of a spectacle holder having a clasp.

Referring now to FIG. 1, there is shown an embodiment of a spectacle holder, generally referred to with reference numeral 100. The spectacle holder 100 of FIG. 1 is shown holding a spectacle 102. The spectacle holder 100 includes a loop member 104. The loop member 104 can be a continuous loop of material. Alternatively, the loop member 104 can have first and second ends 104a, 104b and a clasp 106 for attaching the first and second ends to form a loop as shown in FIG. 2. The clasp 106 can be any of a number of types known in the jewelry arts. Furthermore, the loop member 104 can be fabricated from a number of materials, such as fabric, rope, and chain. The rope and chain can be natural material, plastic, elastomer, or metal.

The spectacle holder 100 also includes a sliding member 108 slidingly disposed on the loop member 104. The sliding member 108, can be fabricated from any material known in the art, such as plastic, metal, stone, jewels (precious and semi-precious), natural materials, such as ivory or pearl and any combination thereof. The sliding member 108 slides on the loop member 104 to capture a portion of a spectacle 110 in a portion of the loop member 112. As shown in FIG. 1, the portion of the spectacle 110 captured can be a hinge portion 114 of the spectacle 102 comprising a connection between a front 116 and a temple 118 of the spectacle 102. The sliding member 108 can be slid in the direction of Arrow A (up) when a sliding force is applied to open a loop defined at least in part by the portion of the loop member 112. After insertion of the portion of the spectacle 110, the sliding member 108 is slid in a direction opposite to Arrow A (down) with the application of a closing force to positively capture the portion of the spectacle 110 and thereby securing the spectacle thereto.

Figure 3A:
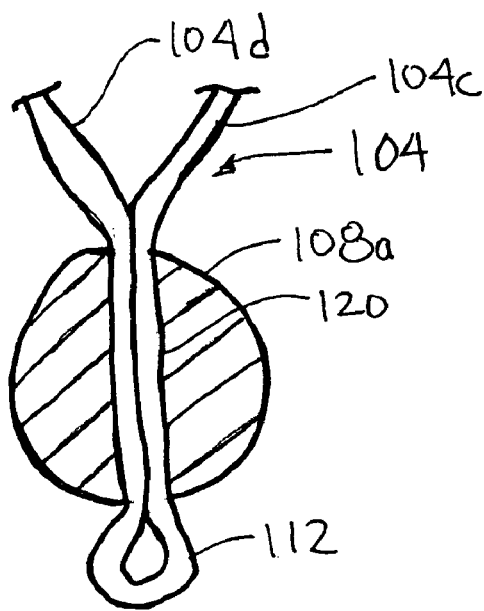
FIG. 3A illustrates a sectional view of a sliding member of a spectacle holder having a single through hole.
Figure 3B:
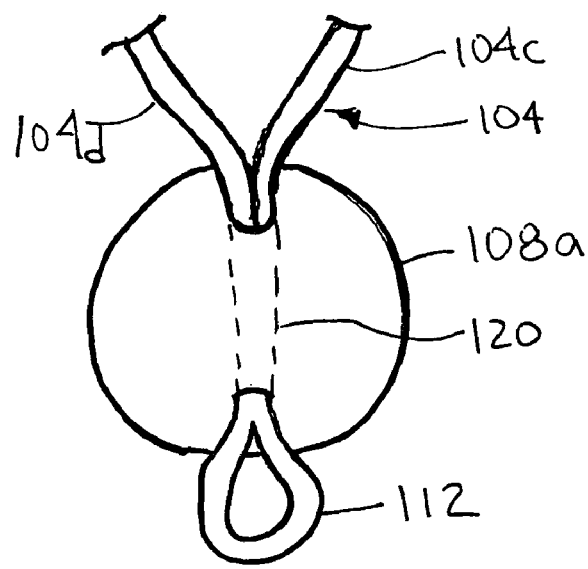
FIG. 3B illustrates a back view of a sliding member of a spectacle holder having a single through hole.

FIGS. 3A and 3B show a first variation of the sliding member, referred to by reference numeral 108a. The sliding member 108a of FIGS. 3A and 3B has a single hole 120 therethrough for acceptance of first and second strands 104c, 104d of the loop member 104. The first and second strands 104c, 104d, are inserted into the hole 120 such that the sliding member 108a can freely slide on the loop member 104 when the sliding or closing force is applied thereto and the sliding member 108a remains stationary with respect to the loop member 104 when no sliding or closing force is applied. Alternatively, a manual stop/spring mechanism can be disposed in or on the sliding member 108 to manually lock the same relative to the loop member 104. The sliding member 108a in FIG. 3A differs from the sliding member of FIG. 3B (although both are referred to with reference numeral 108a) in that the location of an entrance and exit of the hole 120 differs (as will be discussed below).

Figures 5A, 5B, 5C:
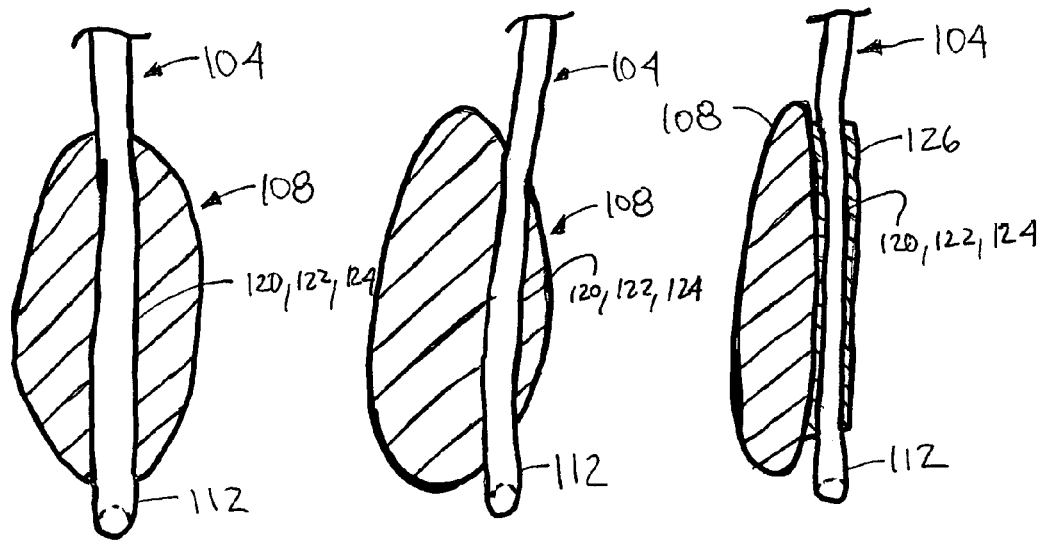
FIG. 5A illustrates a side view of the sliding members of either FIG. 3A or 4A.
FIG. 5B illustrates a side view of the sliding members of either FIG. 3B or 4B.
FIG. 5C illustrates a side view of a sliding member having first and second holes on an exterior surface of the sliding member.

As shown in FIGS. 5A and 5B, the hole 120 can be integrally formed in the sliding member 108 and centrally located from front to back in the sliding member (FIG. 5A) or offset towards the front or back (FIG. 5B). Furthermore, as shown in FIG. 5C, the hole 120 can be formed on an exterior surface of the sliding member 108, such as in a tube 126 connected to the sliding member. The tube 126 can be provided in one length as shown in FIG. 5C or in tube portions, such as a first tube portion (not shown) near the top of the sliding member 108 and a second tube portion (not shown) at the bottom of the sliding member 108. The tube (or tube portions) can be connected to the exterior surface of the sliding member 108, in many ways known in the art, such as by adhesive or brazing. The tube 126 (or tube portions) can also be integrally formed on the exterior surface of the sliding member 108.

Figure 4A:
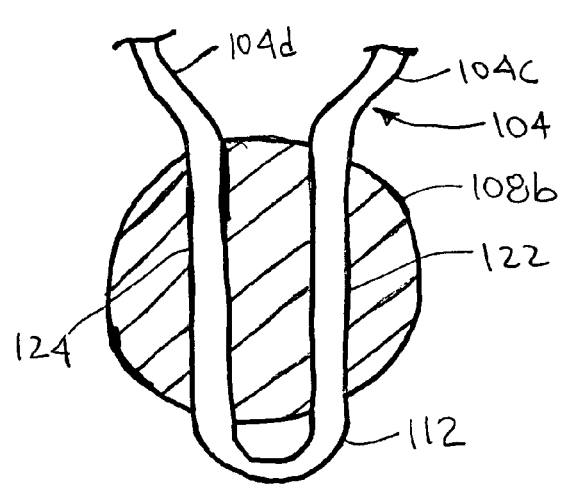
FIG. 4A illustrates a sectional view of a sliding member of a spectacle holder having first and second through holes.
Figure 4B:
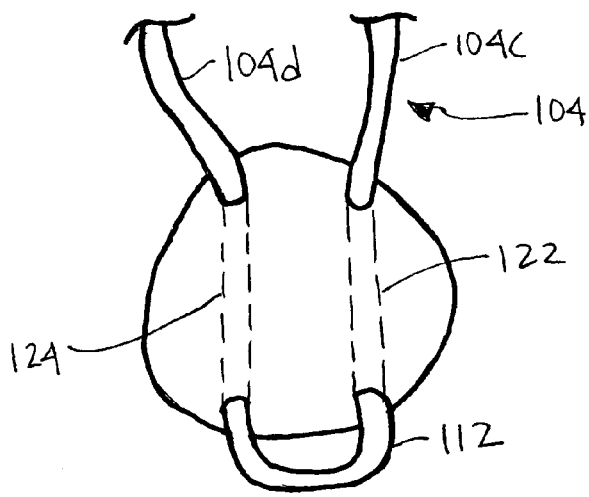
FIG. 4B illustrates a back view of a sliding member of a spectacle holder having first and second through holes.

FIGS. 4A and 4B show a second variation of the sliding member, referred to by reference numeral 108b. The sliding member 108b of FIGS. 4A and 4B has first and second holes 122, 124 therethrough for acceptance of first and second strands 104c, 104d of the loop member 104, respectively. That is, the first stand 104c is disposed in the first hole 122 and the second strand 104d is disposed in the second hole 124. As with the sliding member of FIGS. 3A and 3B, the first and second strands 104c, 104d, are inserted into the first and second holes 122, 124 such that the sliding member 108b can freely slide on the loop member 104 when the sliding or closing force is applied thereto and the sliding member 108b remains stationary with respect to the loop member 104 when no sliding or closing force is applied. The sliding member 108b in FIG. 4A differs from the sliding member of FIG. 4B (although both are referred to with reference numeral 108b) in that the locations of entrances and exits of the first and second holes 122, 124 differ (as will be discussed below).

As shown in FIGS. 5A and 5B, the holes 122, 124 can be integrally formed in the sliding member 108 and centrally located from front to back in the sliding member (FIG. 5A) or offset towards the front or back (FIG. 5B). Furthermore, as shown in FIG. 5C, the holes 122, 124 can be formed on an exterior surface of the sliding member 108, such as in tubes 126 connected to the sliding member. The tubes 126 can be provided in one length as shown in FIG. 5C or in tube portions as described above. The tube (or tube portions) can be connected to the exterior surface of the sliding member 108 or integrally formed therein as also described above.

Figure 6A:
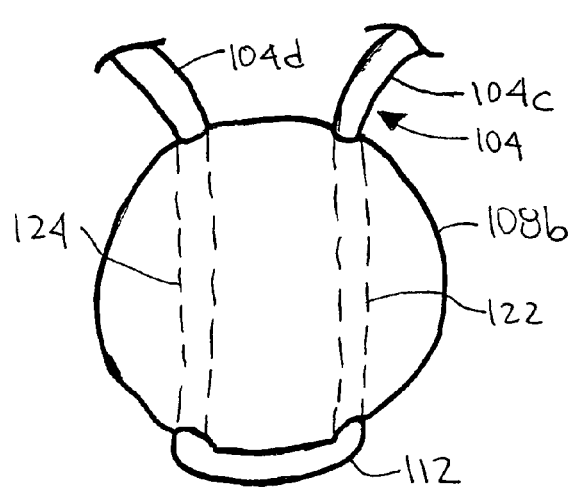
FIG. 6A illustrates the sliding member of FIG. 4A with a portion of the loop member completely withdrawn.
Figure 6B:
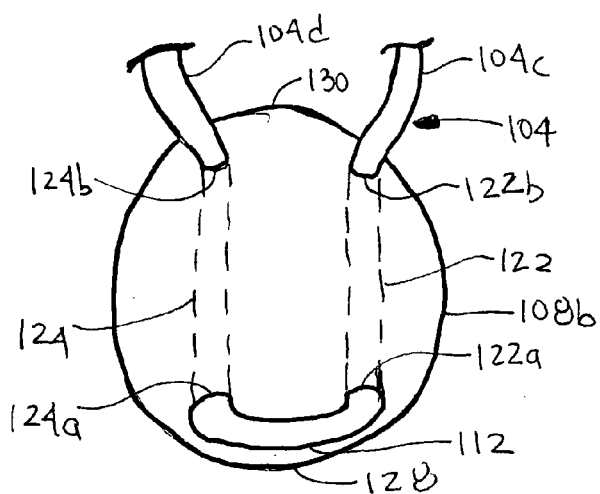
FIG. 6B illustrates the sliding member of FIG. 4B with a portion of the loop member completely withdrawn.

Referring now to FIG. 6A, the sliding member 108 can be configured such that the portion of the loop member 112 is visible when the same is withdrawn against the sliding member 108b. Thus, when wearing the spectacle holder 100 while spectacles 102 are not being captured, the portion of the loop member 112 is visible to others. Although, sliding member 108b is shown in FIG. 6A, the sliding member 108a having a single hole 120 can be similarly configured, as shown in FIG. 3A. However, as shown in FIG. 6B, the sliding member 108b can be configured such that the first and second holes 122, 124 each have an exit 122a, 124a located above a lower portion 128 of the sliding member such that the portion of the loop member 112 is hidden from view when worn by a user and no spectacle 102 is captured. Entrances 122b, 124b can be similarly hidden by being below a top portion 130 of the sliding member 108b. Although, sliding member 108b is shown in FIG. 6B, the sliding member 108a having a single hole 120 can be similarly configured, as shown in FIG. 3B.

Figure 7:
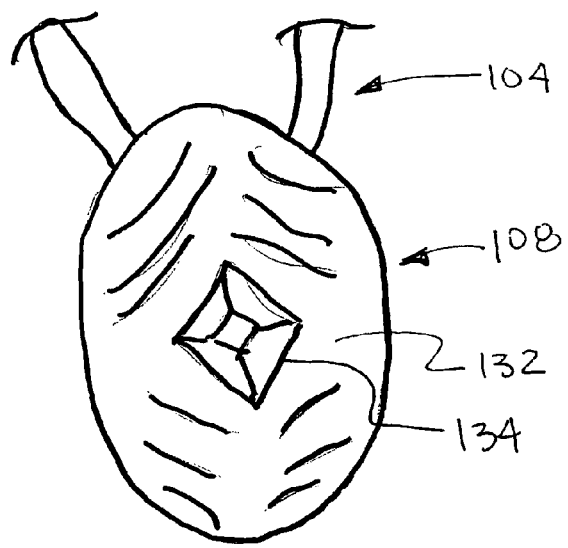
FIG. 7 illustrates a front view of a sliding member having a decorative portion.

Referring now to FIG. 7, the sliding member 108 can be decorative, such as by having a decorative face 132 which may contain precious or semi-precious stones 134. Thus, the sliding member can be a charm, broach, or pendant. In such a configuration, the decorative sliding member has particularly utility when used in combination with the features illustrated in FIGS. 5C and/or 6B. In such configurations, the spectacle holder 100 has the appearance of a necklace when the spectacle 102 is not being captured and the portion of the loop member 112 is withdrawn so as not to be visible to others. Therefore, when not being used to hold spectacles, the spectacle holder 100 can be worn as a decorative necklace thus avoiding the appearance of using a spectacle holder or the necessity to remove the spectacle holder when spectacles are not being held.

While the invention has been described in connection with the preferred embodiments of the system and its functional components, it is not intended to limit the invention to the particular forms set forth but, on the contrary, it is intended to cover such alternatives, modifications and equivalents as may be included within the spirit and scope of the invention as defined by the appended claims.

What is claimed is:

1. A spectacle holder comprising:
    a loop member to be worn around a neck of a person; and
    a sliding member slidingly disposed on the loop member;
    wherein the sliding member slides on the loop member to capture a portion of a spectacle in a portion of the loop member extending below the sliding member and wherein the sliding member has one or more holes therethrough for acceptance of first and second strands of the loop member, the one or more holes having an exit located on the back and above a lower portion of the sliding member.

2. The spectacle holder of claim 1, wherein the loop member is a continuous loop of material.

3. The spectacle holder of claim 1, wherein the loop member has first and second ends and a clasp for attaching the first and second ends to form a loop.

4. The spectacle holder of claim 1 wherein the loop member is fabricated from a material chosen from a group consisting of fabric, rope, and chain.

5. The spectacle holder of claim 1, wherein the sliding member has a single hole therethrough for acceptance of first and second strands of the loop member.

6. The spectacle holder of claim 1, wherein the sliding member has first and second holes therethrough for acceptance of first and second strands of the loop member, respectively.

7. The spectacle holder of claim 1, wherein the sliding member has one or more holes therethrough for acceptance of first and second strands of the loop member, the one or more holes being integrally formed in the sliding member.

8. The spectacle holder of claim 1, wherein the sliding member has a one or more holes therethrough for acceptance of at least a portion of the loop member, the one or more holes being formed on an exterior surface of the sliding member.

9. The spectacle holder of claim 1, wherein the sliding member is decorative.

10. The spectacle holder of claim 9, wherein the decorative sliding member is chosen from a group consisting of a charm, broach, and pendant.

* * * * *